(12) United States Patent
Eisenbeis

(10) Patent No.: US 9,219,442 B2
(45) Date of Patent: Dec. 22, 2015

(54) METHOD AND APPARATUS FOR MONITORING MOTOR CURRENT FOR AN ELECTRIC VALVE POSITIONER

(71) Applicant: FISHER CONTROLS INTERNATIONAL LLC, Marshalltown, IA (US)

(72) Inventor: Clyde T. Eisenbeis, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 81 days.

(21) Appl. No.: 14/202,414

(22) Filed: Mar. 10, 2014

(65) Prior Publication Data
US 2014/0265983 A1    Sep. 18, 2014

Related U.S. Application Data

(60) Provisional application No. 61/785,139, filed on Mar. 14, 2013.

(51) Int. Cl.
| | | |
|---|---|---|
| *H02P 7/00* | (2006.01) | |
| *H02P 29/02* | (2006.01) | |
| *H02H 7/08* | (2006.01) | |
| *G05B 19/042* | (2006.01) | |

(52) U.S. Cl.
CPC ............ *H02P 29/02* (2013.01); *G05B 19/0428* (2013.01); *H02H 7/08* (2013.01); *G05B 2219/14045* (2013.01); *G05B 2219/14046* (2013.01)

(58) Field of Classification Search
None
See application file for complete search history.

(56) References Cited

U.S. PATENT DOCUMENTS

2002/0109473 A1*    8/2002    Romanowich et al. ........ 318/434

FOREIGN PATENT DOCUMENTS

| DE | 102 31 797 A1 | 1/2004 |
|---|---|---|
| DE | 10 2009 043037 A1 | 4/2011 |

OTHER PUBLICATIONS

International Search Report for PCT/US2014/022259, mailed Jul. 30, 2014.
Written Opinion for PCT/US2014/022259, mailed Jul. 30, 2014.
International Preliminary Report on Patentability and Written Opinion of the International Searching Authority in counterpart International Application No. PCT/US2014/022259, dated Sep. 24, 2015 (8 pages).

\* cited by examiner

*Primary Examiner* — Eduardo Colon Santana
*Assistant Examiner* — Cortez Cook
(74) *Attorney, Agent, or Firm* — Marshall, Gerstein & Borun LLP

(57) ABSTRACT

A system and method for monitoring and controlling the amount of electrical current provided to a motor used to actuate a field device within a control system.

12 Claims, 4 Drawing Sheets

METHOD AND APPARATUS FOR MONITORING MOTOR CURRENT FOR AN ELECTRIC VALVE POSITIONER

CROSS-REFERENCE TO RELATED APPLICATION

The present application claims the benefit of U.S. Provisional Patent Application No. 61/785,139, filed on Mar. 14, 2013, the entire disclosure of which is hereby incorporated by reference herein for all purposes.

FIELD OF THE DISCLOSURE

This disclosure relates generally to control systems and, more particularly, to a method and apparatus for monitoring and controlling a motor used to actuate a portion of a field device within a control system.

BACKGROUND

Control systems, which include process control systems and safety instrumented systems (SIS), typically implement one or more controllers to control the process or safety system. The controllers in these systems frequently use field devices to perform a variety of functions within the control environment. For example, in a level control system, the field devices may be used to monitor and/or control the amount of a liquid in a holding tank. When the level of the liquid has reached a predetermined position (high or low), the control system may respond by utilizing one of the field devices, such as a valve, to adjust the flow of liquid entering or exiting the holding tank.

In many control systems, there may be a component of a field device that is required to move during normal operation. The implementation and/or operating environment of the field device may subject the movable component of the field device to high loads, such as high pressure or friction loads, which may contribute to the movable component's inertia at rest. For example, the movable component may be a valve or lever that is idle for a substantial period of time during normal use. A motor is commonly used by the control system to actuate such a movable component. To move the movable component, the motor must overcome the movable component's inertia at rest. In overcoming the movable component's inertia at rest, the motor may draw electrical current from its power source at levels beyond the prescribed operating range of the motor. Although it may be possible to utilize larger motors that are capable of safely operating at higher amounts of electrical current, the larger motors are more expensive and may not be readily adaptable for configuration within an existing control system.

SUMMARY

Example systems and methods to monitor and control a field device in a control system are herein described. In accordance with a first exemplary aspect of the control system having a valve capable of being positioned in response to an occurrence of an event trigger, the control system includes a controller with a processor coupled to a memory. The controller has a position input, a position output for providing a position signal, and a control output for providing a control signal. A gate having a first state and a second state is coupled to the control output of the controller. The gate includes a control input and a control output, wherein the control input of the gate is coupled to the control output of the controller. A motor driver interface includes a position input, a control input, and a control output, wherein the position input of the motor driver interface is coupled to the position output of the controller, and wherein the control input of the motor driver interface is coupled to the control output of the gate. A motor driver includes a control input and a control output, wherein the control input of the motor driver is coupled to the control output of the motor driver interface. A motor is coupled to the control output of the motor driver and the valve. A current sensor for sensing electrical current provided to the motor is operatively coupled between the motor and its power source. A position sensor is coupled to the motor and the controller and provides position information of the motor to the controller. A comparator is coupled to the current sensor and the gate. The comparator includes a threshold current level and is capable of providing a state signal to the gate in response to a comparison of the electrical current sensed by the current sensor and the threshold current level. The state signal provided to the gate places the gate in the first state, which enables the control signal from the controller to pass to the motor driver interface, when the electrical current sensed by the current sensor is less than the threshold current level. Additionally, the state signal provided to the gate places the gate in the second state, which prevents the control signal from the controller from passing to the motor driver interface, when the current sensed by the current sensor is equal to or greater than the threshold current level.

In accordance with a second exemplary aspect, a method is provided for controlling a field device in a control system. The method includes providing a memory device including a threshold current value, detecting an occurrence of an event trigger, and sending a control signal to a motor to actuate a field device in response to detecting the occurrence of the event trigger. The method monitors an electrical current provided to the motor, compares the monitored electrical current provided to the motor to the threshold current level, and executes a first command if the monitored electrical current provided to the motor is less than the threshold current level, and executes a second command if the monitored electrical current provided to the motor is equal to or greater than the threshold current level.

In accordance with a third exemplary aspect, a control system for controlling a process includes a field device coupled to the process and arranged to control a process condition, a motor coupled to the field device and configured to move a portion of the field device, and a controller including a processor and a memory, wherein the processor is operatively coupled to the motor for controlling the motor to move the portion of the field device. A current sensor is coupled to the motor and is arranged to monitor electrical current drawn by the motor and a control module is coupled to the controller to regulate passage of control signals transmitted to the motor for moving the portion of the field device.

In further accordance with any one or more of the foregoing first, second, or third exemplary aspects, a control system and/or method may further include any one or more of the following preferred forms.

In one preferred form, the control system includes a gate having a first state and a second state, wherein the gate includes a control input and a control output and the control input of the gate is coupled to a control output of the controller, and the control output of the gate is operatively coupled to the motor.

In another preferred form, the control system includes a comparator coupled to the current sensor and the gate. The comparator includes a threshold current level and is capable of providing a state signal to the gate in response to a comparison of the current sensed by the current sensor and the threshold current level. The state signal provided to the gate places the gate in the first state or the second state, wherein the first state enables the control signal from the controller to pass to the motor when the current sensed by the current sensor is less than the threshold current level, and the second state disables the control signal from the controller to pass to the motor when the current sensed by the current sensor is equal to or greater than the threshold current level.

In another preferred form, the position sensor is a Hall effect sensor operatively coupled to the motor.

In another preferred form, the current sensor is a resistor operatively coupled between the motor's power source and the motor.

In another preferred form, the current sensor is a Hall effect sensor operatively coupled between the motor and the motor's power source.

In another preferred form, the control module includes a gate and a comparator operatively coupled to the current sensor, wherein the comparator includes a threshold current level and is capable of providing a state signal to the gate in response to a comparison of the current sensed by the current sensor and the threshold current level. The state signal provided to the gate places the gate in the first state or the second state, wherein the first state enables the control signal from the controller to pass to the motor driver when the current sensed by the current sensor is less than the threshold current level, and the second state disables the control signal from the controller to pass to the motor driver when the current sensed by the current sensor is equal to or greater than the threshold current level.

In another preferred form, the control module is capable of being executed on the processor to compare the current sensed by the current sensor to a threshold current level. When the current sensed by the current sensor is less than the threshold current level, control signals sent from the controller are allowed to pass through to the motor. When the current sensed by the current sensor is equal to or greater than the threshold current level, control signals sent from the controller are not allowed to pass through to the motor.

DETAILED DESCRIPTION

Figure 1:
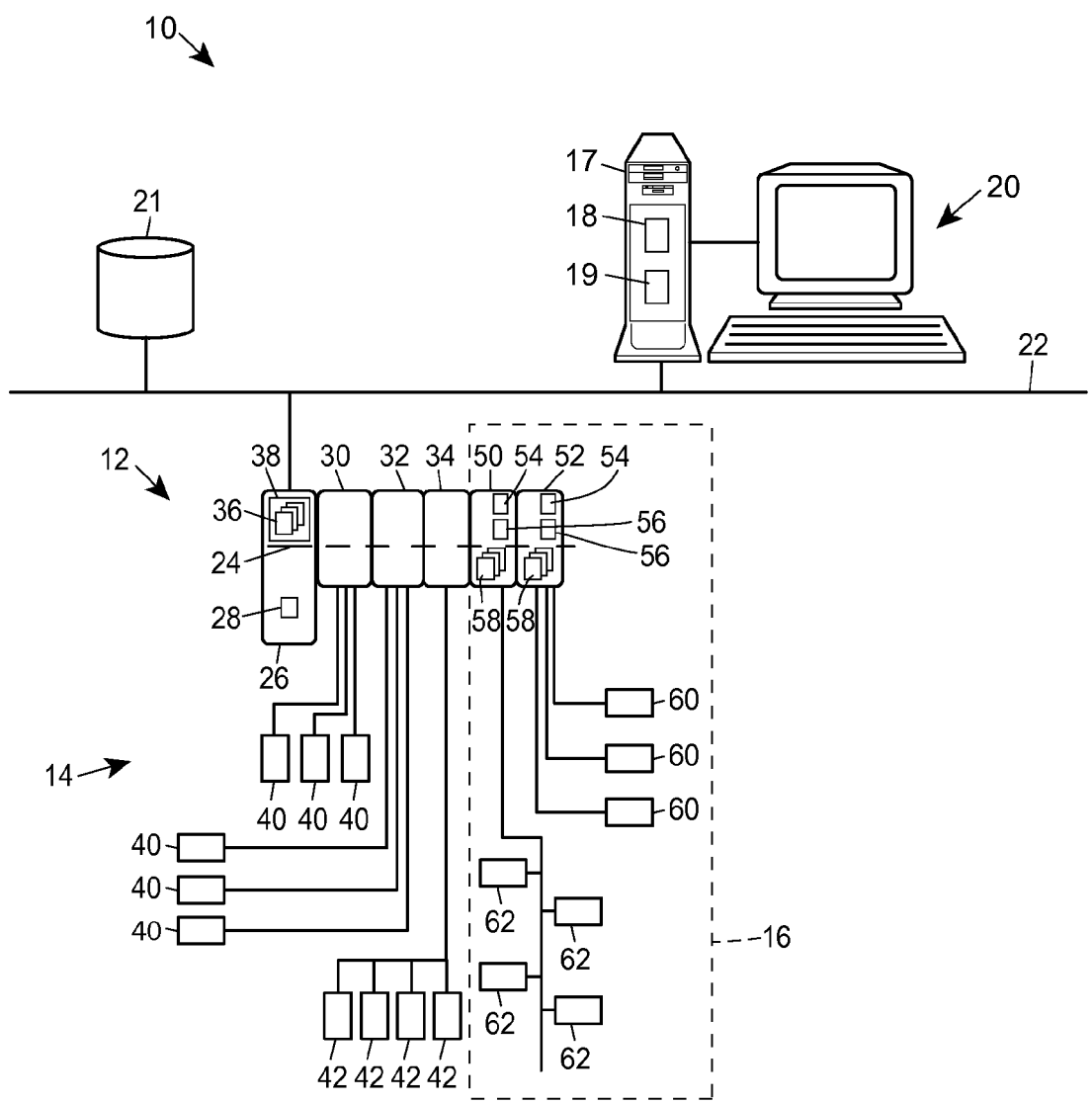
FIG. 1 is a block diagram of an exemplary process plant having a process control system and a safety system.

In FIG. 1, a process plant 10 is shown to include a process control/safety control node 12, which may include a process control system 14 integrated with a safety system 16 (depicted within dotted lines). The safety system 16 generally operates as a safety instrumented system (SIS) and may monitor the operation of the process control system 14 to ensure the safe operation of the process plant 10. If necessary, the safety system 16 may override control of the process control system 14.

The process plant 10 also includes one or more workstations 17 or computing devices, which may be any type of computer, for example. Each workstation 17 may include a processor 18, a memory device 19, and/or a user interface 20 such as a display monitor and/or keyboard that are accessible by control personnel. In the example process plant 10 illustrated in FIG. 1, the workstation 17 is shown connected to the process control/safety control node 12 and to an external memory device 21 via a common communication line or bus 22. The communication bus 22 may be implemented using any desired bus-based or non-bus-based hardware, hardwired or wireless communication structure, or suitable communication protocol, such as an Ethernet protocol.

The process plant 10 illustrated in FIG. 1 includes both process control system devices and safety system devices operatively connected together via the bus structure that may be provided on a common backplane 24 into which different process controllers and input/output devices are attached. The process plant 10 also includes at least one process controller 26 having a processor 28 and one or more process control system input/output (I/O) devices 30, 32, 34. Each process control system I/O device 30, 32, 34 is communicatively connected to a set of process control related field devices, illustrated in FIG. 1 as controller field devices 40, 42. The controller 26, the I/O devices 30, 32, 34, and the field devices 40, 42 generally make up the process control system 14 of the process control/safety control node 12.

The process controller 26, which may be, by way of example only, a DeltaV™ controller sold by Emerson Process Management or any other desired type of process controller, is programmed to provide process control functionality using the I/O devices 30, 32, 34 and the field devices 40, 42. In particular, the processor 28 of the controller 26 implements or oversees one or more control processes or control strategies in cooperation with the field devices 40, 42 and the workstation 17 to control the process plant 10 or a portion of the process plant in any desired manner. The field devices 40, 42 may be any desired type, such as sensors, valves, transmitters, positioners, etc., and may conform to any desired open, proprietary, or other communication or programming protocol including, for example, the HART or the 4-20 ma protocol (as illustrated for the field devices 40), any bus protocol such as the Foundation® Fieldbus protocol (as illustrated for the field devices 42), or the CAN, Profibus, and AS-Interface protocols, to name but a few. Similarly, each of the I/O devices 30, 32, 34 may be any known type of process control I/O device using any appropriate communication protocol.

The controller 26 may be configured to implement the control process or the control strategy in any desired manner. For example, the controller 26 may implement a control strategy using what are commonly referred to as function blocks, wherein each function block is a part or object of an overall control routine and operates in conjunction with other function blocks (via communications called links) to implement process control loops within the process control system 14. Function blocks typically perform one of: an input function such as that associated with a transmitter, a sensor, or other process parameter measurement device; a control function such as that associated with a control routine that performs PID, fuzzy logic, etc., control; or, an output function that controls the operation of some device such as a valve to perform some physical function within the process control system 14. Hybrids of these function blocks, as well as other types of function blocks, may also exist. While the description of the control system is provided herein using a function block control strategy that incorporates an object oriented programming paradigm, the control strategy or control routines or control loops or control modules could also be implemented or designed using other conventions, such as ladder logic or sequential function charts, for example, or using any other desired programming language or paradigm.

For the purposes of this disclosure, the terms control strategy, control routine, control module, control function block, safety module, safety logic module, and control loop essentially denote a control program executed to control the process or safety system and these terms may be interchangeably used herein. However, for the purposes of the following discussion, the term control module will be used. It should further be noted that control module described herein may have parts thereof implemented or executed on by different controllers or other devices if so desired. In addition, the control modules described herein to be implemented within the process control system 14 and/or the safety system 16 may take any form, including software, firmware, hardware, and any combination thereof. For example, the control modules, which may be control routines or any part of a control procedure such as a subroutine or parts of a subroutine (such as lines of code), may be implemented in any desired software format, such as using ladder logic, sequential function charts, control routine diagrams, object oriented programming or any other software programming language or design paradigm. Likewise, the control modules described herein may be hard-coded into, for example, one or more EPROMs, EEPROMs, application specific integrated circuits (ASICs), programmable logic controllers (PLCs), or any other hardware or firmware elements. The control modules may be designed using any design tools, including graphical design tools or any other type of software/hardware/firmware programming or design tools.

One or more control modules 36, which may be stored in a memory 38 on the controller 26, may be executed on the processor 28 of the controller, which is typically the case when these function blocks are used or associated with standard 4-20 ma devices and some types of smart field devices such as HART devices. The control modules 36 may also be stored in other memory locations 19, 21 within the system 10 or implemented by the field devices 40, 42 themselves, which may be the case with Fieldbus devices.

The safety system 16 of the process control/safety control node 12 includes one or more safety system logic solvers 50, 52. Each of the logic solvers 50, 52 is a safety controller (also invariably referred to as an I/O device) having a processor 54 capable of executing safety logic modules 58. The safety logic modules 58, which may be similar to the control modules 36, may be stored in a memory 56 location of one or both logic solvers 50, 52. The logic solvers 50, 52 are communicatively connected to provide control signals to and/or receive signals from safety system field devices 60, 62. The safety controllers 50, 52 and the safety system field devices 60, 62 generally make up the safety system 16 of FIG. 1.

The safety field devices 60, 62 may be any desired type of field device conforming to or using any known or desired communication protocol, such as those mentioned above. In particular, the field devices 60, 62 may be safety-related field devices of the type that are conventionally controlled by a separate, dedicated safety-related control system, such as a liquid level detector or an emergency shutdown (ESD) valve. In the process plant 10 illustrated in FIG. 1, the safety field devices 60 are depicted as using a dedicated or point-to-point communication protocol, such as the HART or the 4-20 ma protocol, while the safety field devices 62 are illustrated as using a bus communication protocol, such as a Fieldbus protocol. Generally, the safety devices (both the controllers 50, 52 and the safety system field devices 60, 62) used as part of the safety system 16 will be rated as safety devices, which typically means that these devices must go through a rating procedure to be rated by an appropriate body as a safety device.

The backplane 24 (indicated by a dashed line through the process controller 26, the I/O devices 30, 32, 34, and the safety controllers 50, 52) is used to connect the process controller 26 to the process control I/O cards 30, 32, 34 as well as to the safety controllers 50, 52. The process controller 26 is also communicatively coupled to the bus 22 and operates as a bus arbitrator to enable each of the I/O devices 30, 32, 34 and the safety controllers 50, 52 to communicate with the workstation 17 and/or the memory device 21 via the bus 22. The backplane 24 also enables the safety controllers 50, 52 to communicate with one another and coordinate safety functions implemented by each of these devices, to communicate data to one another, or to perform other integrated functions.

A display module (not shown) may be stored in the memory 19 of the workstation 17. However, if desired, the display module may be stored and executed in a different workstation or in another computing device associated with the process plant 10. The display module may be any type of interface that, for example, enables a user to manipulate data values (for example, perform reads or writes) to thereby alter operation of the control 36 or safety modules 58 within either or both of the control system 14 and the safety system 16. Thus, if a write is specified to be made to the control module 36 associated with the control system 12 or to one of the field devices 40, 42, for example, the display module enables that write to take place. Additionally, if the write is specified to be made to the safety logic module 58 associated with the safety system 16 or to one of the field devices 60, 62, for example, the display module enables that write to occur.

By and large, the control system of the present invention is configured to respond to a target or an occurrence of an event trigger associated with a process condition. A controller includes one or more control modules that may be executed by any one or more of the processors to monitor and/or control the process via one or more field devices coupled to the process. Process or safety information is attained by the one or more field devices and provided to control personnel and/or the controller wherein the process may be adjusted, if necessary. For example, in a level detecting process employing a liquid holding tank, the controller may collaborate with one or more field devices to monitor the amount of liquid held within the tank and control the amount of retained liquid by opening and/or closing an inlet and/or an outlet valve.

To position or actuate the valve(s), a motor may be employed by the controller. In moving the valve, the motor may draw an amount of electrical current from its power source that approaches or perhaps exceeds the motor's rated operating limit. If the motor draws too much electrical current, there is a risk that the motor will burn out. To guard against damaging the motor as a result of excessive electrical current being supplied to the motor, the controller may use a sensor to detect the amount of electrical current being drawn by the motor. If the electrical current supplied to the motor exceeds limit, such as a threshold current level or value, the condition will be detected by a sensor. In particular, detection by the sensor will be indicated by the sensor being tripped. After the sensor has been tripped, steps may be initiated to reduce or suspend operation of the motor until a later time, such as when the electrical current being drawn by the motor returns below the upper threshold value.

Figure 2:
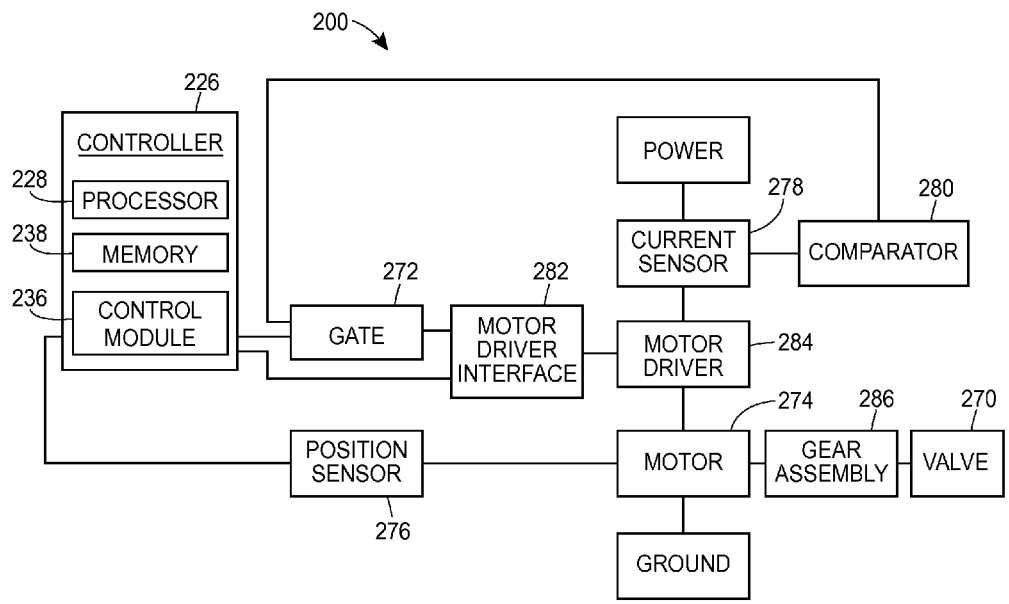
FIG. 2 is a block diagram of one embodiment of the invention.

One example implementation of the present invention for monitoring and/or controlling electrical current for a valve positioner is shown in FIG. 2. In this implementation 200, a controller 226 includes a processor 228 and a memory 238 coupled to the processor. The controller 226 is operatively coupled via a gate 272 to a motor 274 for positioning a valve 270. One or more control modules 236 capable of being executed on the processor 228 to control the valve 270 may be stored in the memory 238 of the controller 226 and/or in another memory device (not shown) coupled to the controller. Control signals are sent by the controller 226, for example, the processor 228, to the motor 274 for controlling the operation of the motor. The control signal can be of any type, such as a pulse-width modulated signal (PWM) or a pulse-duration modulated (PDM) signal, for example. To ensure proper operation and control of the motor 274, the transmission of the control signals is coordinated with the position of the motor's 274 windings. A position sensor 276, which may be one or more Hall effect sensors coupled proximate the motor's winding(s), determines the position(s) of the motor's 274 winding(s) and provides the information to the controller 226, which is then provided to a motor driver interface 282.

The gate 272 regulates the control signals sent to the motor 274 and includes a first or enable state and a second or disable state. Control signals transmitted by the controller 226 are only allowed to pass through the gate 272 to the motor 274 if the motor is operating within user-desired operating parameters. In particular, the transmission of the controls signals that are provided to the motor 274 for positioning the valve 270 are regulated by the gate 272 to ensure that the control signals are only passed through to the motor when the motor is operating within a desired range of electrical current.

The amount of electrical current supplied to the motor 274 by its power source is monitored by a current sensor 278 operatively coupled between the motor and the motor's power source. The current sensor 278 may be a resistor or Hall effect sensor operatively coupled between the motor 274 and the power node or ground node of a power source for the motor. The current sensor 278 detects and/or measures the electrical current provided to the motor 274 and converts the measured electrical current to a value that is representative of the measured electrical current. The representative value is provided to a comparator 280 that includes a threshold current level. The threshold current level denotes the desired operating limit for electrical current supplied to the motor 274. If the value of the sensed electrical current supplied to the motor 274 is less than the threshold current level, a state signal may be sent by the comparator 280 to the gate 272 to enable the gate and allow the control signals transmitted from the controller 226 to pass through the gate and reach the motor 274. Otherwise, if the value that is representative of the sensed electrical current supplied to the motor 274 is equal to or greater than the threshold current level, a state signal may be sent by the comparator 280 to the gate 272 to disable the gate and prevent the control signals transmitted from the controller 226 to pass through the gate to reach the motor.

To facilitate the transmission of the control signals from the controller 226 to the motor 274, the motor driver interface 282 and a motor driver 284 may be coupled between the gate 272 and the motor 274. The motor driver interface 282 enables the coupling of the controller 226 to the motor driver 284. More specifically, a position output of the controller 226 may be coupled to a position input of the motor driver interface 282, wherein information related to the position of the motor's 274 winding(s) may be provided to the motor driver interface. The motor driver interface 282 may utilize field-effect transistors (FET) to coordinate or synchronize the control signal received from the gate 272 with the position of the winding(s) or phase(s) of the motor 274 and provide a control output to the motor driver 284 to ensure proper operation and control of the motor 274. A gear assembly 286 may be coupled between the motor 274 and the valve 270 to facilitate the actuation of the valve by the motor.

Figure 3:
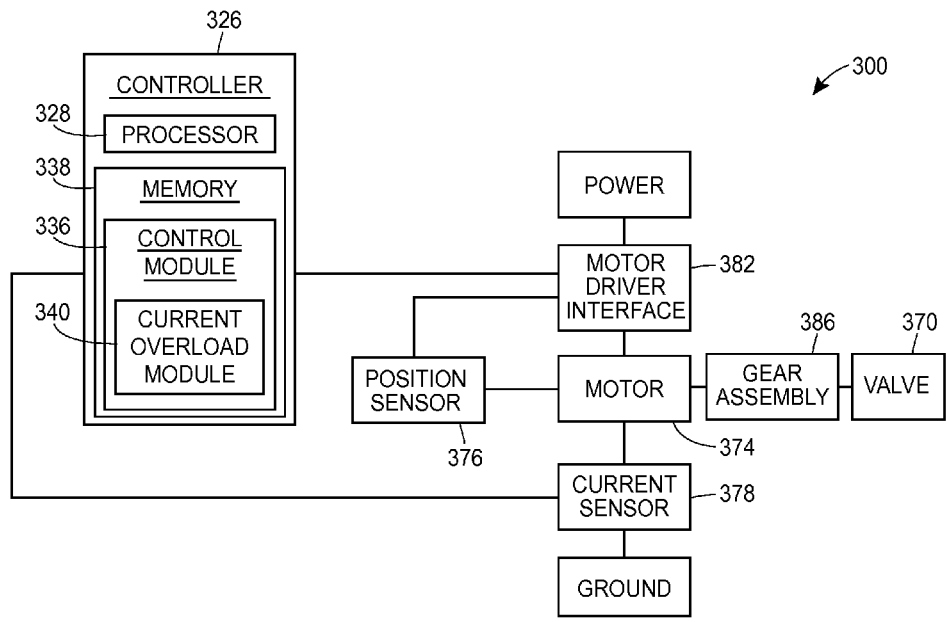
FIG. 3 is a block diagram of another embodiment of the invention.

Another example implementation of the present invention for monitoring and/or controlling electrical current supplied to the electric valve positioner is shown in FIG. 3. In this implementation 300, a controller 326 includes a processor 328 and a memory 338 coupled to the processor. One or more control modules 336 capable of being executed on the processor 328 may be stored on the memory 338 and utilized by the controller 326 to transmit a control signal to control a motor 374 for positioning a valve 370. The control signal can be of any type, such as a pulse-width modulated signal (PWM) or a pulse-duration modulated (PDM) signal, for example. A gear assembly 386 including one or more gears may be coupled between the motor 374 and the valve 370 to facilitate the actuation of the valve by the motor.

A motor driver interface 382 may be coupled between the controller 326 and motor 374 for coordinating or synchronizing control signals transmitted to the motor 374 with the position or phase of the motor's winding(s) to ensure proper operation and control of the motor. The position of the motor's 374 winding(s) may be determined by a position sensor 376 coupled between the motor and the motor driver interface 382. The position sensor 376 may be a Hall effect sensor operatively coupled proximate the winding(s) of the motor 374 and is capable of sensing the position of the motor's winding(s). The position sensor 376 determines the position of the motor's 374 windings and provides the information to the motor driver interface 382.

The amount of electrical current drawn by the motor 374 and supplied by its power source is monitored by a current sensor 378, which is operatively coupled between the motor and the motor's power source. The current sensor 378 may be coupled between the motor 374 and the ground node of the power source, as shown in FIG. 3, or between the motor and the power node of the power source. The current sensor 378 may be a resistor or a Hall effect sensor operatively coupled to the motor 374 and is capable of measuring or sensing the amount of electrical current being supplied to the motor 374. In the implementation where the current sensor 378 is a resistor, a value that represents the amount of electrical current sensed by the current sensor 378 may be defined in units of voltage.

The value representative of the electrical current sensed by the current sensor 378 is provided to the controller 326. The controller 326 utilizes a control module 336 to regulate the transmission of the control signal from the controller to the motor driver interface 382. In particular, when executed on the processor 328 of the controller 326, a current overload module 340 compares the value representative of the electrical current sensed by the current sensor 378 to a threshold current level or value. The threshold current level denotes a user-desired operating limit of the electrical current supplied to the motor 374. If the representative value corresponding to the sensed electrical current supplied to the motor 374 is less than the voltage value corresponding to the threshold current level, the current overload module 340 will enable transmission of the control signal(s) to the motor 374 via the motor driver interface 382. Otherwise, if the representative value that corresponds to the sensed electrical current supplied to the motor 374 is equal to or greater than the corresponding value of the threshold current level, the current overload module 340 will prevent transmission of the control signal(s) to the motor. When the electrical current supplied to the motor 374 returns below the threshold current level, the controller 326 may resume transmitting the control signal to the motor.

Figure 4:
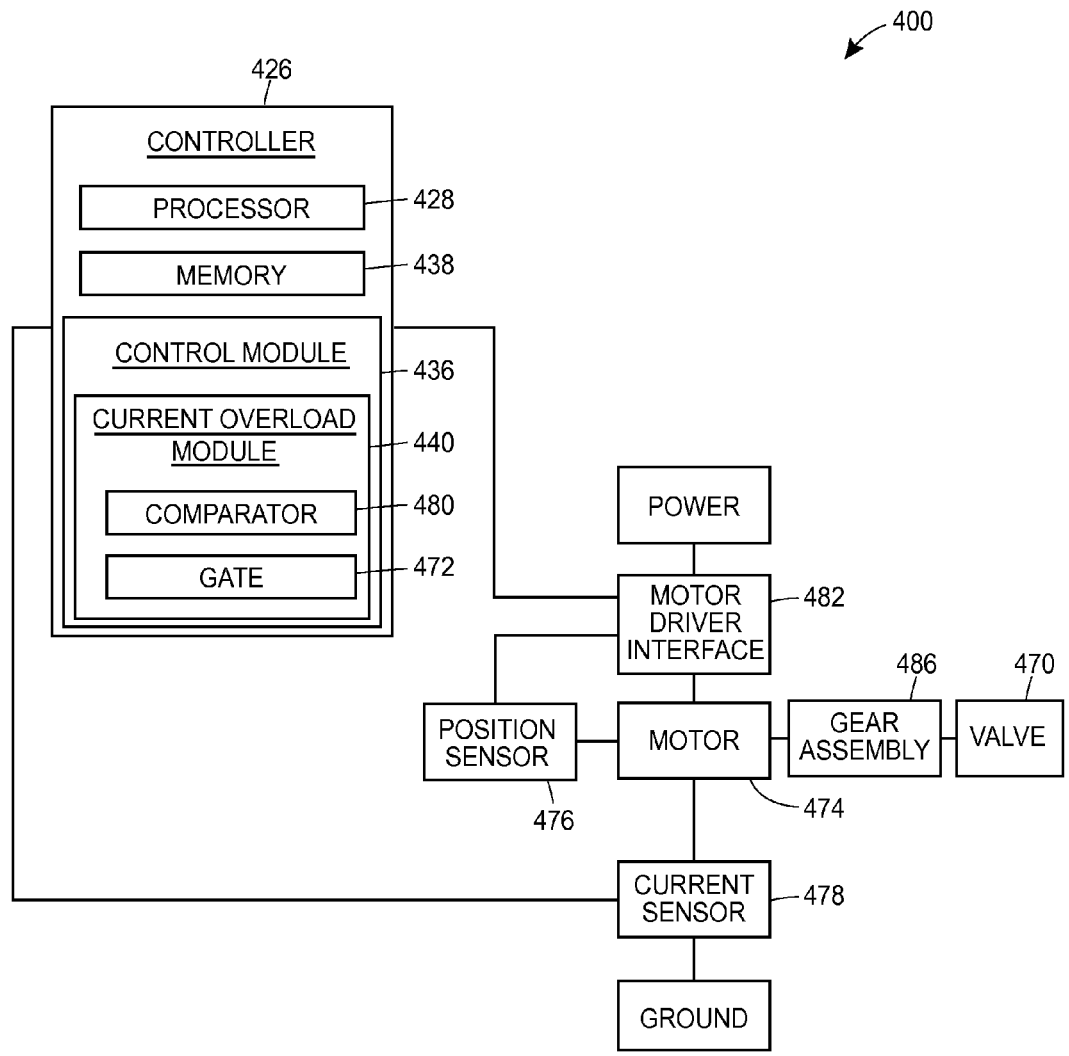
FIG. 4 is a block diagram of another embodiment of the invention.

Another example implementation of the present invention for monitoring and/or controlling electrical current supplied to a motor for positioning a valve is shown in FIG. 4. In this implementation 400, a controller 426 includes a processor 428 and a memory 438 coupled to the processor. The controller 426 is coupled via a motor driver interface 482 to a motor 474 for actuating a valve 470. One or more control modules 436 capable of cooperating with the processor 428 may be utilized by the controller 426 to control the motor 474 for positioning the valve 470. One or more control signals may be sent by the processor 428 of the controller 426 to control the motor 474. The control signal can be of any type, such as a pulse-width modulated signal (PWM) or a pulse-duration modulated (PDM) signal, for example. A gear assembly 486 including one or more gears may be coupled between the motor 474 and the valve 470 to facilitate the actuation of the valve by the motor.

A motor driver interface 482 may be coupled between the controller 426 and motor 474 for coordinating or synchronizing the control signals transmitted to the motor 474 with the position or phase of the motor's winding(s) to ensure proper operation and control of the motor. A position sensor 476, which may be coupled between the motor 474 and the motor driver interface 482, may determine the position of the motor's winding(s). The position sensor 476 may be a Hall effect sensor operatively coupled proximate the winding(s) of the motor 474 and is capable of sensing the position of the motor's winding(s). The position sensor 476 determines the position of the motor's 474 windings and provides the information to the motor driver interface 482.

A current sensor 478 monitors the amount of electrical current drawn by the motor 474 and supplied by its power source. The current sensor 478 may be coupled between the motor 474 and its power source. That is, the current sensor 478 may be coupled between the motor 474 and the ground node of the power source, as shown in FIG. 4, or between the motor and the power node of the power source. The current sensor 478 may be a resistor or a Hall effect sensor operatively coupled to the motor 474 and is capable of determining a value that is representative of the sensed electrical current being supplied to the motor. In the implementation where the current sensor 478 is a resistor, the value that represents the electrical current sensed by the current sensor 478 may be defined in units of voltage. The value representative of the electrical current sensed by the current sensor 478 is provided to the controller 426.

The controller 426 utilizes a control module 436 to regulate the transmission of the control signals to the motor 474 in response to a comparison of the electrical current sensed by the current sensor 478 to a threshold current level or value. The threshold current level denotes a user-desired operating limit of the electrical current supplied to the motor 374. More specifically, a current overload module 440 may utilize a comparator 480 in combination with a gate 472 to regulate the transmission of the control signals from the controller 426 to the motor driver interface 482. The comparator 480 includes the threshold current level and is capable of providing a state signal to the gate 472 in response to a comparison of the threshold current level and the current sensed by the current sensor 478. If the current sensed by the current sensor 478 is less than the threshold current level, the state signal provided by the comparator 480 to the gate 472 places the gate in an enabling state to allow control signals transmitted from the controller 426 to pass through the gate to the motor driver interface 482. If the current sensed by the current sensor 478 is equal to or greater than the threshold current level, the state signal provided by the comparator 480 to the gate 472 places the gate in a disabling state, which prevents control signals transmitted from the controller 426 to pass through to the motor driver interface 482.

Figure 5:
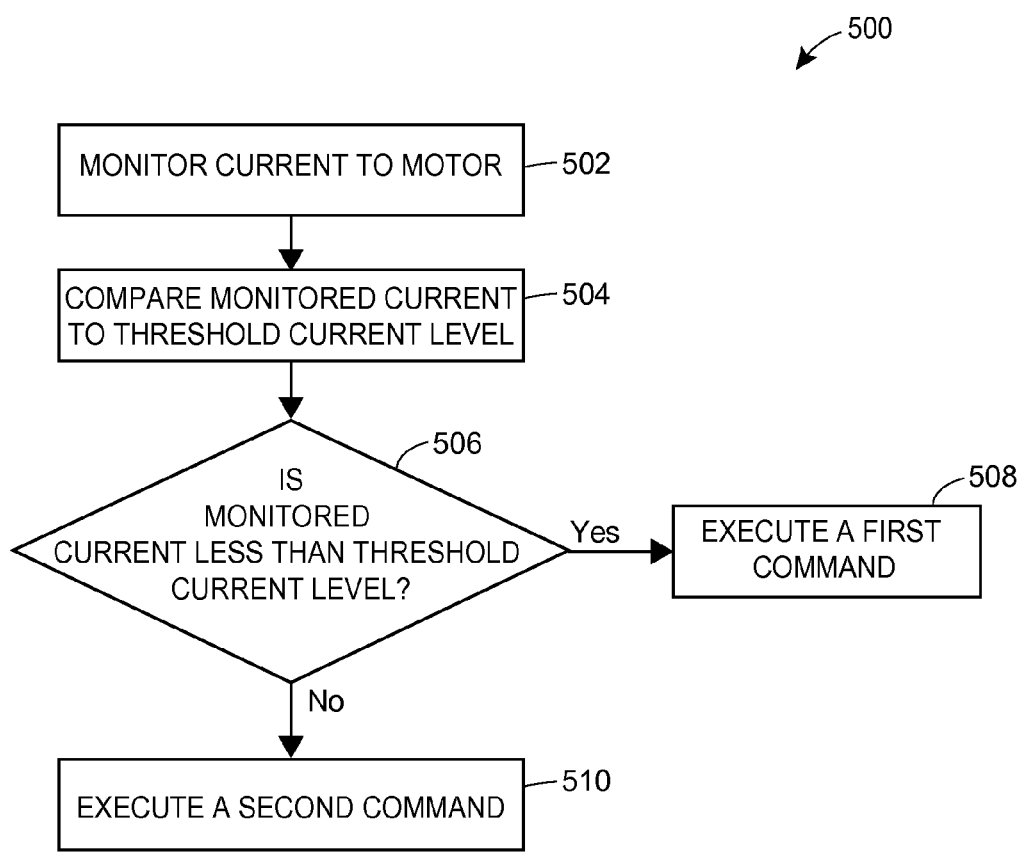
FIG. 5 illustrates an example module or process flow diagram to monitor the motor current of an electric valve positioner utilized in any one of the implementations of the present invention shown in FIGS. 2-4.

FIG. 5 depicts a flowchart 500 of an example method of the invention that may be used with any of the configurations shown in FIGS. 2-4, where the amount of electrical current provided to the motor can be monitored and controlled. The electrical current provided to the motor is monitored via the current sensor (block 502). The sensed electrical current is compared to the threshold current level (block 504). A determination is made of the monitored current with respect to the threshold current level (block 506). If the sensed electrical current is less than the threshold current level, the processor of the controller may execute a first command (block 508). The first command may include permitting control signals from the controller pass through to the motor. Alternatively, if the sensed electrical current is equal to or greater than the threshold current level, the processor of the controller may execute a second command (block 510). The second command may include preventing or precluding control signals from the controller to pass through to the motor.

It is apparent from the description above that reliable safeguards for a motor used to position a component of a field device, such as a valve, for example, may be implemented by utilizing a current sensor to monitor the electrical current supplied to the motor. Damage to the motor can be avoided by adjusting the operation of the motor in response to the monitored electrical current exceeding a user-desired operating limit of the electrical current provided to the motor.

Although certain example methods, apparatus and articles of manufacture have been described herein, the scope of coverage of this patent is not limited thereto. On the contrary, this patent covers all methods, apparatus, and articles of manufacture fairly falling within the scope of the appended claims either literally or under the doctrine of equivalents.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

For example, the control system 10 may include, but is not limited to, any combination of a LAN, a MAN, a WAN, a mobile, a wired or wireless network, a private network, or a virtual private network. Moreover, while only two workstations are illustrated in FIG. 1 to simplify and clarify the description, it is understood that any number of workstations or user interfaces are supported and can be implemented.

Additionally, certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software), may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a plant environment, an office environment, or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a plant or office environment). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, for the purposes of illustration only, the figures depict preferred embodiments of a verification system for a field device within a control system. One skilled in the art will readily recognize from the discussion above that alternative embodiments of the structures and methods illustrated herein may be employed without departing from the principles described herein.

What is claimed is:

1. A control system including a valve, wherein the valve is positioned in response to an occurrence of an event trigger, the control system comprising:
    a controller including a processor for controlling the valve, the controller further including a position input, a position output providing a position signal, and a control output providing a control signal;
    a memory coupled to the processor;
    a gate having a first state and a second state, the gate including a control input and a control output, wherein the control input of the gate is coupled to the control output of the controller;
    a motor driver interface including a position input, a control input, and a control output, wherein the position input of the motor driver interface is coupled to the position output of the controller, and wherein the control input of the motor driver interface is coupled to the control output of the gate;
    a motor driver including a control input and a control output, wherein the control input of the motor driver is coupled to the control output of the motor driver interface;
    a motor coupled to the control output of the motor driver;
    a current sensor operatively coupled between the motor and its power source, the current sensor for sensing current provided to the motor;
    a position sensor coupled to the motor and the controller, wherein the position sensor provides a position of the motor to the controller; and
    a comparator coupled to the current sensor and the gate, the comparator including a threshold current level and being capable of providing a state signal to the gate in response to a comparison of the current sensed by the current sensor and the threshold current level, wherein the state signal provided to the gate places the gate in the first state enabling a control signal from the controller to pass to the motor driver interface when the current sensed by the current sensor is less than the threshold current level, and wherein the state signal provided to the gate places the gate in the second state preventing the control signal from the controller to pass to the motor driver interface when the current sensed by the current sensor is equal to or greater than the threshold current level.

2. The control system of claim 1, wherein the current sensor is a resistor.

3. The control system of claim 1, wherein the current sensor is a Hall effect sensor.

4. The control system of claim 1, wherein the position sensor is a Hall effect sensor.

5. The control system of claim 1, further comprising a gear assembly coupled between the motor and the valve for facilitating positioning of the valve by the motor.

6. A method of controlling a field device in a control system including a controller and a threshold current level stored in a memory device, the method comprising:
    detecting an occurrence of an event trigger;
    sending, by the controller, a control signal to a motor to actuate the field device in response to detecting the occurrence of the event trigger;
    monitoring, by a current sensor, an electrical current provided to the motor;
    comparing, by a comparator, the monitored electrical current provided to the motor to the threshold current level;
    providing, by the comparator, a state signal to a gate coupled between the controller and the motor, wherein the state signal provided to the gate places the gate in a first state enabling the control signal sent by the controller to pass to the motor when the current sensed by the current sensor is less than the threshold current level, and wherein the state signal provided to the gate places the gate in a second state preventing the control signal sent by the controller to pass to the motor when the current sensed by the current sensor is equal to or greater than the threshold current level.

7. The method of claim 6 further comprising:
sensing a position of the motor; and
coordinating the sending of the control signal with the sensed position of the motor.

8. A control system for controlling a process, the control system comprising:
    a field device coupled to the process and arranged to control a process condition;
    a motor coupled to the field device and configured to move a portion of the field device;
    a controller including a processor and a memory, the processor being operatively coupled to the motor for controlling the motor to move the portion of the field device;
    a current sensor coupled to the motor and arranged to monitor electrical current drawn by the motor; and
    a control module coupled to the controller and capable of regulating passage of control signals transmitted to the motor for moving the portion of the field device, wherein the control module includes:
        a gate having a first state and a second state, the gate including a control input and a control output, wherein the control input of the gate is coupled to a control output of the controller, and a comparator coupled to the current sensor and the gate, the comparator including a threshold current level and being capable of providing a state signal to the gate in response to a comparison of the current sensed by the current senor and the threshold current level, wherein the state signal provided to the gate places the gate in the first state enabling a control signal sent by the controller to pass to the motor when the current sensed by the current sensor is less than the threshold current level, and wherein the state signal provided to the gate places the gate in the second state preventing the control signal sent by the controller to pass to the motor when the current sensed by the current sensor is equal to or greater than the threshold current level.

9. The control system of claim 8, wherein the current sensor is a resistor.

10. The control system of claim 8, wherein the current sensor is a Hall effect sensor.

11. The control system of claim 8, further comprising:
a position sensor coupled to the motor and the controller, wherein the position sensor provides a position of the motor to the controller.

12. The control system of claim 11, wherein the position sensor is a Hall effect sensor.

* * * * *